US007154395B2

(12) United States Patent
Raskar et al.

(10) Patent No.: US 7,154,395 B2
(45) Date of Patent: Dec. 26, 2006

(54) INTERACTIVE WIRELESS TAG LOCATION AND IDENTIFICATION SYSTEM

(75) Inventors: Ramesh Raskar, Cambridge, MA (US); Paul A. Beardsley, Boston, MA (US); Jeroen van Baar, Brookline, MA (US); Paul H. Dietz, Hopkinton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 361 days.

(21) Appl. No.: 10/883,235

(22) Filed: Jul. 1, 2004

(65) Prior Publication Data

US 2006/0001543 A1    Jan. 5, 2006

(51) Int. Cl.
*G08B 1/08* (2006.01)
(52) U.S. Cl. ............................. 340/572.4; 340/572.1; 340/539.23; 340/539.25; 340/10.1
(58) Field of Classification Search ............. 340/572.1, 340/572.4, 539.23, 539.25; 235/375, 385; 348/169; 382/103
See application file for complete search history.

(56) References Cited

U.S. PATENT DOCUMENTS

| 5,134,277 | A  | * | 7/1992 | Yerbury et al. ........ 250/214 RC |
| RE35,816  | E  | * | 6/1998 | Schulz .................... 356/608 |
| 5,874,724 | A  | * | 2/1999 | Cato ....................... 235/492 |
| 6,369,879 | B1 | * | 4/2002 | Pedersen ................. 356/3.01 |
| 6,437,820 | B1 | * | 8/2002 | Josefsson ................. 348/169 |
| 6,504,605 | B1 | * | 1/2003 | Pedersen et al. ......... 356/141.1 |
| 2004/0151365 | A1 | * | 8/2004 | An Chang et al. ....... 382/154 |
| 2004/0239653 | A1 | * | 12/2004 | Stuerzlinger ............ 345/183 |

OTHER PUBLICATIONS

Abelson et al., Amorphous computing. In *Communications of the ACM*, vol. 43(5), 74-82. 2000.
Azuma et al., Recent Advances in Augmented Reality. In *IEEE Computer Graphics and Applications*, vol. 21(6), 34-47. 2001.
Bimber et al., 2001. The virtual showcase as a New Platform for Augmented Reality Digital Storytelling. *IEEE Comput. Graph. Appl. 21*, 6, 48-55.
Hinckley et al., 2000. Sensing Techniques for Mobile Interaction. In *ACM UIST CHI Letters*, vol. 2(2), 91-100.
Ma et al., 2002. The FindIT Flashlight: Responsive Tagging Based on Optically Triggered Microprocessor Wakeup. In *Ubicomp*, 160-167.
Moore et al., 1999. Implementing Phicons: Combining Computer Vision with InfraRed Technology for Interactive Physical Icons. In *Proceedings of ACM UIST'99*, 67-68.

(Continued)

*Primary Examiner*—Jeffery Hofsass
*Assistant Examiner*—Anne V. Lai
(74) *Attorney, Agent, or Firm*—Dirk Brinkman; Clifton D. Mueller; Gene V. Vinokur

(57) ABSTRACT

A wireless location and identification system includes a controller and a tag. The controller has a projector configured to generate a unique temporal sequence of light intensities for each pixel in an output image of the projector and a wireless transceiver configured to emit an output signal and receive an input signal. The tag includes a photo-sensor configured to sense the unique temporal sequence of light intensities of a particular pixel, a transducer configured to receive the output signal from the transceiver, and a means for modulating, according to the unique temporal sequence of light intensities, the input signal for the transceiver in response to receiving the output signal and sensing the unique temporal sequence of light intensities of the particular pixel to indicate a location of the tag to the controller.

36 Claims, 2 Drawing Sheets

OTHER PUBLICATIONS

Nayar et al., 2003. A Projection System with Radiometric Compensation for Screen Imperfections. In *Proc. ICCV Workshop on Projector-Camera Systems (PROCAMS)*.

Omojola et al., 2000. An installation of interactive furniture. In *IBM Systems Journal*, vol. 39(3,4).

Patten et al., 2001. Sensetable: A Wireless Object Tracking Platform for Tangible User Interfaces. In *Conference on Human Factors in Computing Systems (ACM CHI)*.

Pinhanez, C. 2001. The Everywhere Displays Projector: A Device to Create Ubiquitous Graphical Interfaces. In *Ubiquitous Computing 2001 (Ubicomp 01)*.

Raskar et al., 2001. Shader lamps: Animating real objects with image-based illumination. In *Rendering Techniques 2001, Proceedings of the Eurographics Workshop in London, United Kingdom*.

Raskar et al., 2003. ilamps: geometrically aware and selfconfiguring projectors. *ACM Trans. Graph. 22*, 3, 809-818.

Rekimoto et al., 1998. Augmentable Reality: Situated Communication through Digital and Physical Spaces. In *IEEE 2nd International Symposium on Wearable Computers (ISWC 98)*, 68-75.

Ringwald, M. 2002. Spontaneous Interaction with Everyday Devices Using a PDA. Workshop on Supporting Spontaneous Interaction in Ubiquitous Computing Settings. In *UbiComp*.

Underkoffler et al., 1999. Emancipated pixels: Real-world graphics in the luminous room. In *Proc. Siggraph 99, ACM Press*, 385-392.

Verlinden et al., 2003. Development of a Flexible Augmented Prototyping System. In *The 11th International Conference in Central Europe on Computer Graphics, Visualization and Computer Vision'2003*.

Want et al., 1992. The active badge location system. *ACM Trans. Inf. Syst. 10*, 1, 91-102.

Want et al., 1995. An Overview of the ParcTab Ubiquitous Computing Experiment. In *IEEE Personal Communications*, 28-43.

Want et al., 1999. Bridging Physical and Virtual Worlds with Electronic Tags. In *ACM SIGCHI*, 370-377.

Want, R. 2003. RFID, A Key to Automating Everything. In *Scientific American*, vol. 290(1), 56-65.

Weiss, Y. 1999. Segmentation using eigenvectors: a unifying view. In *CVPR*, 975-982.

Raskar et al. "RFIG Lamps: Interacting with a Self-Describing World Via Photosensing Wireless Tags and Projectors" ACM SIGGRAPH 2004, vol. 23, No. 3, pp. 406-415.

* cited by examiner

200

INTERACTIVE WIRELESS TAG LOCATION AND IDENTIFICATION SYSTEM

FIELD OF THE INVENTION

The invention relates generally to identification tags and readers, and more particularly to tags that can be located and identified selectively.

BACKGROUND OF THE INVENTION

Over the years, computer applications have moved from highly centralized mainframes to the desktop. More recently, computing power has moved to mobile devices, such as cellular telephones, personal digital assistants, and sensors embedded unobtrusively in the environment and objects placed in the environment.

One example of this application uses radio-frequency identification (RFID) tags, see Want, "RFID, A Key to Automating Everything," *Scientific American*, vol. 290(1), 56–65, 2003. RFID tags can be as small as a grain of rice, are cheap, e.g., a fraction of a dollar, and can transmit a unique identity to a tag-reader over a range in meters.

Conventional radio-frequency identification (RFID) tags are used to identify objects, including animals and people. RFID tags provide an alternative to bar codes for distinguishing and recording products for purchase. RFID tags can result in labor savings to manufacturers, distributors, and retailers. Annual estimated saving for a larger retailer using RFID tags could amount to billions of dollars per year.

The typical prior art RFID system includes a microchip and an antenna. The antenna can be in the form of a tuned induction coil. The operation is fundamentally simple. Typically, the microchip stores a unique identification code that can be detected when the antenna of the tag couples inductively with an antenna of the reader. This coupling changes the impedance, hence the load at the receiving antenna. The load can be modulated according to the stored identification code, by switching the coil in and out.

Conventional RFID tags can be characterized according to the following basic attributes. An active RFID tag includes a power source to operate the microchip and to 'broadcast' the signal to the reader. Semi-passive tags use a battery to operate the microchip, but use an induced current to operate the transmitter. Because these types of tags are more costly to manufacture, they are typically used for high-cost objects that need to be identified at greater distances. For passive tags, the reader induces a current in the tag by emitting electromagnetic radiation. These tags are relatively cheap, and are effective up to ranges of about 50 meters, depending on the power of the transmitted RF signal.

The tag can be read only, or read and write. In the later type, information can be added to the tag over time using a memory. For example, the tag can store when it was read, or how often it was read.

Existing commercial applications include non-contact access control, ear tags for livestock, and consumer products. More sophisticated tags go beyond simply transmitting an identity. Modern tags embed significant computation power and data. This presents the problem of retrieving and identifying the data provided by RFID tags.

A number of applications are known where real-world objects and environments are augmented with data and small processors.

A number of techniques are known for adding 'intelligence' to objects and, in some cases, building human interactions around intelligent objects. The SenseTable system tracks and augments the area around sensing tablets on a tabletop using a projector, Patten et al., "SenseTable: A Wireless Object Tracking Platform for Tangible User Interfaces," *Conference on Human Factors in Computing Systems, ACM CHI*, 2001. Intelligent furniture is described by Omojola et al., "An installation of interactive furniture," *IBM Systems Journal*, Vol. 39(3,4), 2000.

Some systems use active RF tags that respond to laser pointers. The FindIT flashlight uses a one-way interaction and an indicator light on the tag to signal that a desired object has been found, see Ma et al., "The FindIT Flashlight: Responsive Tagging Based on Optically Triggered Microprocessor Wakeup, *Ubicomp*, pp. 160–167, 2002.

Other systems use a two-way interaction, where the tag responds back to a PDA using a high-power complex communications protocol, such as IEEE 802.11 or X10, Patel et al., "A 2-Way Laser-Assisted Selection Scheme for Hand-helds in a Physical Environment," *Ubicomp*, 2003, and Ringwald, "Spontaneous Interaction with Everyday Devices Using a PDA, *UbiComp*, 2002.

Interaction and Augmentation

Interaction with laser pointers for large display screens is common. A number of sensing and interaction techniques for mobile devices are described by Hinckley et al., "Sensing Techniques for Mobile Interaction," *ACM UIST CHI Letters*, Vol. 2(2), pp. 91–100, 2000.

Augmentation of physical world objects has been primarily achieved via eye-worn or head-mounted displays, see Azuma et al., "Recent Advances in Augmented Reality, *IEEE Computer Graphics and Applications*, vol. 21(6), pp. 34–47, 2001, or hand-held screens. Screen-based augmentation using PDA, camera and RFID tags is described by Want et al., "Bridging Physical and Virtual Worlds with Electronic Tags," *ACM SIGCHI*, pp. 370–377, 1999, and Rekimoto et al., "Augmentable Reality: Situated Communication through Digital and Physical Spaces," *IEEE $2^{nd}$ International Symposium on Wearable Computers (ISWC 98)*, pp. 68–75, 1998.

Projector-based augmentation has been described by Underkoffler et al., "Emancipated pixels: Real-world graphics in the luminous room," *Proc. Siggraph 99, ACM Press*, pp. 385–392, Pinhanez, "The Everywhere Displays Projector: A Device to Create Ubiquitous Graphical Interfaces," *Ubiquitous Computing*, 2001, Raskar et al., "Shader lamps: Animating real objects with image-based illumination," *Rendering Techniques* 2001, *Proceedings of the Eurographics Workshop*, 2001, Bimber et al., "The virtual showcase," *IEEE Comput. Graph. Appl.* 21, 6, pp. 48–55, 2001, and Verlinden et al., "Development of a Flexible Augmented Prototyping System," *The $11^{th}$ International Conference in Central Europe on Computer Graphics, Visualization and Computer Vision '2003*, 2003.

Image warping for a hand-held projector to support shape and object adaptive projection is described by Raskar et al., "ilamps: geometrically aware and selfconfiguring projectors," *ACM Trans. Graph.* 22, 3, pp. 809–818, 2003.

Adding distinctive visual markers for tracking is not always practical. Therefore, it is desired to augment environments and objects without adding infrastructure to obtain a 3D context.

Location sensing systems such as the Olivetti Active Badge, see Want et al., "The active badge location system," *ACM Trans. Inf. Syst.* 10, 1, pp. 91–102, 1992, and Xerox PARCtab, Want et al., "An Overview of the ParcTab Ubiquitous Computing Experiment, *IEEE Personal Communi-* cations, pp. 28–43, 1995, recover location, but have typically been used for passive tracking, and not for interactive systems.

Laser-pointer systems for interacting require a user to identify a target object and direct the pointer at the object to initiate interaction. But accurate pointing is difficult when the tags become visually imperceptible, and multiple tags can only be dealt with serially.

It is desired to provide a system and method that can locate and identify tags placed on objects and in the environment.

SUMMARY OF THE INVENTION

The present invention provides a system and method for instrumenting objects and environments in the real physical world. This makes it possible to interact with the objects and environments using wireless communications to identify, describe, annotate, and accumulate historical data.

The enabling technology uses wireless tags. The tags are compact devices that wirelessly communicate location and identity on request. The tags are advantageous because they are very small and cheap to produce, and do not require an internal source of power. Therefore, tags can be attached to almost anything, and used over long periods of time.

Conventional RFID tags have limitations. A conventional RFID tag cannot communicate its location. The invention provides tags with the capability to communicate data that include identity and 3D location. Therefore, the invention enables a whole new range of applications.

The invention provides a versatile framework for selecting tags, identifying tags, collecting tag data, displaying information related to the tags, and interacting with the data. The invention uses projected illumination to select tags. A 3D coordinate frame is generated to locate the tags. Tag data can be projected directly onto object surfaces to augment the environment.

DETAILED DESCRIPTION OF THE PREFERRED EMBODIMENT

System Structure

Figure 1:
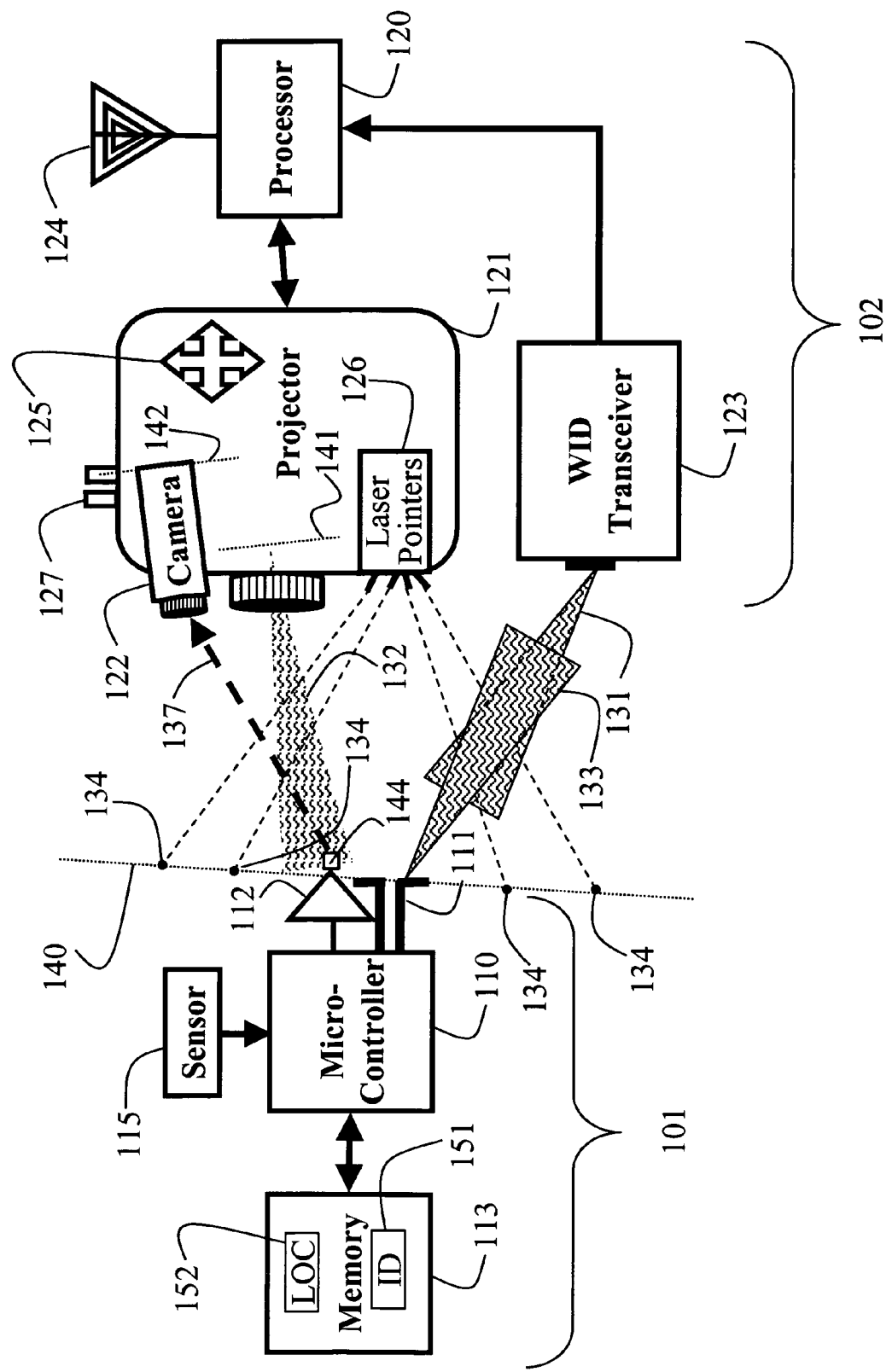
FIG. 1 is a block diagram of an interactive tag location and identification system according to the invention.

As shown in FIG. 1, an interactive tag location and identification system 100 according to our invention includes a tag 101 and a controller 102. We use the word 'controller' to indicate that the system 100 can perform functions other than simply reading the identification of the tag 101. The additional functionality of the interactive system according to our invention is described in detail below. As an advantage, the added functionality enables a whole new set of interactive applications.

Tag

The tag 101 includes a microcontroller 110 connected to a transducer 111, a photo-sensor 112, a memory 113, and optionally, an environment sensor 115. Typically, the tag 101 is mounted so that the sensitive components, i.e., the transducer 111 and sensors 112 and 115 are at or near an external physical surface 140, such as the surface of a box containing goods, or a wall. The memory stores data characterizing the tag and its use in a particular environment.

The transducer 111 can be in the form of a coil, or dipole in the case that the wireless communication uses radio frequency signals. It should also be noted that the transducer can also acquire power parasitically using the wireless communication. The power can be stored in a capacitor, not show. Thus, a battery is not required. It should be understood that other modalities of wireless communication can be used, for example, magnetic signals, sonar, ultrasound, visible light, and infrared.

The photo-sensor 112 can be in the form of an LED that is driven in reverse and forward bias by the microcontroller so as to both sense and emit light, as described in U.S. patent application Ser. No. 10/126,761 "Communication Using Bi-Directional LEDs," filed by Dietz et al. on Apr. 19, 2002, and incorporated herein by reference in its entirety. Thus, the tag 101 can visually indicate when it is selected and active.

The memory can store data such as a tag identification (ID) 151, and application related information. The memory can also store location (LOC) information 152.

The environment sensor can be configured to sense temperature, humidity, smoke, gases, sound, acceleration, and the like.

Controller

The tag controller 102 includes a processor 120, which is connected to a projector 121 and an optional camera 122. The controller also includes a transceiver 123 and an antenna 124. The projector 121 is in a fixed physical relationship to the camera 122. The tag controller can also include a six degrees-of-freedom (DOF) inertial sensor 125, e.g., a gyroscope and an accelerometer, and lasers pointers 126, e.g., four or more, and one or more control buttons 127.

The processor includes a microprocessor, memory, and I/O interfaces for communicating with the various connected components. The memory stores programs and data that implement the functionality described below.

The projector 121 and the camera 122 have associated image planes 141–142, respectively. The planes 141–142 do not need to be parallel to each other. In fact, it is intended for the controller 102 to be hand-held and mobile. The camera 122 can be used to determine a pose, i.e., position and orientation, of the projector 121, to support user interactions, and to acquire surface texture of a scene in the form of images. The images can be converted to graphics models, such as triangle meshes as described below. The texture images can be further processed and projected on the surface 140 along with other images during operation of the system 100.

The inertial sensor 125 can also used for pose determination by providing high-frequency estimates, e.g., 160 Hz, of change in pose of the controller 102.

The antenna 124 is used for communicating data with other computer systems using any suitable network.

The laser pointers 126, which can emit visible or infra-red (IR) light, project distinctive points 134 on the surface 140 to assist the determination of the pose of the projector.

Euclidean calibration of optical parameters between all components of the controller 102 is done off-line, and in the remaining discussion, we assume that the calibrated intrinsic and extrinsic parameters of the projector 121 and camera 122 are known.

It is intended that the controller is portable and mobile during operation. For example, the controller 102 is hand-held.

Interactive Functions

Selecting Tags

A conventional RFID tag responds only to short-range RF signals received from a tag reader placed in an immediate vicinity of the tag. Limiting the communication range to a selected tag is usually achieved by placing the reader very close the tag. This mode of operation is ideal in a retail setting for check-out and security functions, where it is desired that other tags in the environment, such as those placed on goods in nearby display areas, do not respond. However, that mode of operation is not suitable for large scale environments, such as warehouses, where a large number of the goods are stored on shelves, often out of reach of workers performing inventory control functions, or where goods are automatically moved to different locations. In addition, that mode of operation is not suitable for applications where it is desired to place tags in the environment, for example on the walls, ceiling, floor, and other portions to determine a structure of the environment.

Light Activated Tag

Therefore, we select a tag for interaction without the prior art proximity constraint. As part of initialization and calibration, the photo-sensor 112 records an amount of ambient light to be used as base-level for subsequent illumination readings.

The transceiver 123 emits an output signal 131 to activate all in-range tags. If the tag 101 senses a projected illumination 132 that is substantially greater than the base-level light reading, then the tag responds with an output signal 133. The response can be modulated to transmit any of data stored in the memory 113 of the tag. If the tag is not illuminated sufficiently, then the output signal 131 is ignored, and the tag 101 does not respond. It should be understood that the tag can be activated by any number of light sources.

The size of the area selected can vary by changing the size and shape of the light beam 132. When thus activated, the photo-sensor 112 can be driven in reverse bias to emit light as an acknowledgement. In an alternative embodiment, the photo-sensor is sensitive only to light at a selected frequency. This can be accomplished by using a color filter at the sensor, or tuning the photo-sensor for a particular wavelength.

Location Sensing in Tag

Conventional RFID systems can determine what tags are within range, but not their locations. In contrast, the system 100 according to the invention can provide the locations of in-range tags. Directional RF devices could be used, but such devices require very large antennas, and are not suitable for hand-held, mobile operation. The camera 122 can not always be used, because its field of view may not coincide exactly with that of the projector.

Figure 2:
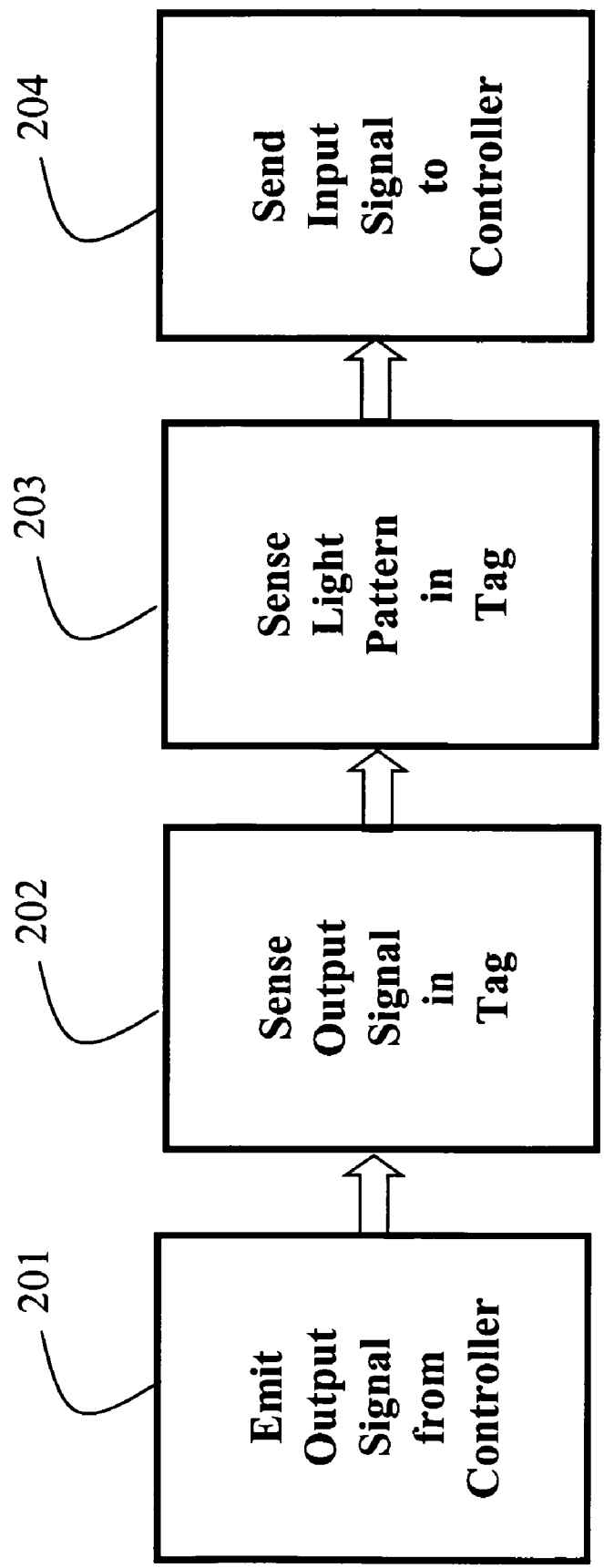
FIG. 2 is a flow diagram of a method for sensing tag data according to the invention.

There, as shown in FIG. 2, our basic method 200 operates as follows. The output signal 131 activates 201–202 the tag 101, as described above. During location related operations, the projector 121 generates a unique temporal sequence of light intensities for each pixel in its output image, i.e., the beam 132, see Gray, "Pulse Code Communication," U.S. Pat. No. 2,632,058, Mar. 17, 1953, U.S. patent application Ser. No. 10/635,404, "Method and System for Calibrating Projectors to Arbitrarily Shaped Surfaces With Discrete Optical Sensors Mounted at the Surfaces," filed by Lee et al., on Aug. 6, 2003, and U.S. patent application Ser. No. 10/704,098, "Light Pen System for Pixel-Based Displays," filed by Dietz et al., on Nov. 7, 2003, all incorporated herein by reference. In essence, the temporal sequence encodes a location of the pixel with respect to the projector image plane 141.

Because the photo-sensor is approximately the size, or smaller than a single projected pixel 144, the sensor 112 senses 203 the unique temporal sequence of light intensities of a particular pixel 144 when it is illuminated by the projector. The microcontroller processes the sequence of light intensities and converts it to a binary string of bits using conventional DSP and pulse shaping functions.

The input signal 133 for the transceiver 123, as generated 204 by the transducer 111, is then modulated according to the sensed unique temporal sequence of light intensities in response to receiving the output signal 133 and sensing the unique temporal sequence of light intensities 134 of the particular pixel 144 to indicate the location 152 of the tag to the controller. The tag can also send back the identity 151 of the tag in the input signal 133 for the transceiver 123 as [tag-id, (x,y)]. It should be noted, that the location and identity can be received by any other receiver in the vicinity of the tag.

It should be noted that the sensor could sense multiple pixels, if the distance between projector and tag is very small. This only decreases the accuracy of the location and does not impede the functioning of the system.

The specifics of how to determine the 2D or 3D coordinates of the tag 101 geometry to a greater accuracy are as follows.

We assume that that tags are placed at approximately known positions on objects or in the environment, e.g., the vertices of an object. However, a more accurate location is required for subsequent augmentation. The above section can determine the 3D position of an individual tag relative to the controller 102. However, errors in individual calculations can make this approach unsuitable to determine the locations of multiple tags in a common coordinate frame.

Therefore, we prefer a method that is based on structure-from-motion. Under this framework, locations of the 2D features in the output images 131 depend on coordinates in 3D space, and a relative 3D motion between the projector and the tag, and the projector's internal geometry. We first calibrate both viewpoints with respect to some world coordinate system, and determine the so-called epipolar geometry by extracting the essential matrix of the system, and from this compute the three-dimensional Euclidean structure of the imaged scene. In both approaches the underlying principle of binocular vision is that of triangulation. For a single view, the three-dimensional location of any visible object point must lie on a straight line that passes through the center of projection and the image of the point. The determination of the intersection of two such lines generated from two independent views is called triangulation.

For a given placement of the controller 102 relative to the tag 101, we want to determine the projector pixels $x_i$, $i=1, \ldots, m$ that illuminate each of m tags, using the method of Graycode projection as described above. We repeat the illumination of tag for N distinct placements of the handheld controller 102. This reduces to the following computer vision problem. We compute structure from N views of m matched features.

We determine the essential matrix E between two views. The essential matrix expresses the relationship between a point in 3D, and the centers of projection for the two views. We initialize a Euclidean coordinate frame and the 3D positions of the tags. Each subsequent view is processed, using a Kalman filter to update the 3D locations of the tags. Then, we apply bundle adjustment to refine the final result. The primary purpose of a bundle adjustment is to optimally determine the 3-dimensional co-ordinates of points from 2-dimensional image measurements.

We transform the coordinate frame to a world vertically aligned system, using the tilt of the inertial sensor 125. Delaunay triangulation is used to construct a 3D mesh of tag vertices and hence surface facets. All the computed geometry and connectivity is stored in the tags 101.

A projector subsequently recovers its pose in the object coordinate frame as follows. We illuminate the tag and recover the projector pixel $x_i$ illuminating each tag by the method of projected Gray-codes, as described above. We retrieve the 3D coordinates $X_i$ stored in each tag. This again reduces to a standard computer vision problem, requiring no modification to the projector 121, which is treated as a pinhole device. We determine the projector pose given 2D–3D correspondences $(x_i, X_i)$. Given the projector internal parameters, we use four correspondences to determine the projector pose.

Location Sensing in Projector

The camera 122 can acquire an input image 137 of the projected light pattern 132 to find the correspondence between the projected gray-codes in the projector's image plane 141 and coordinates of the camera image plane 142. By having a calibrated projector-camera system and knowing the pixel position of the tag on the projector image plane 141 and on the camera image plane 142, the 3D position of the tag can be determined by triangulation. The pose of the projector in the 3D coordinate frame is available as an integral part of the calibration information.

Stable Projection

With the projector and tags in a 3D coordinate frame, the projector can project images to a specified location on the surface 140. However, hand-motion jitter of the hand-held controller can cause projection jitter. Therefore, the invention provides means for stabilizing the projection.

We allow projection on a planar surface, with skew, or other surface shapes as described in U.S. Pat. No. 6,709,116 "Shape-Adaptive Projector System," issued to Raskar et al., on Mar. 3, 2004. There are three methods to obtain the pose of the projector.

The first method is based on an image acquired by the camera 122 of an untextured plane 140. This provides the pose relative to the plane, up to an unknown translation in the plane and an unknown rotation around the plane normal.

The second method is based on the camera viewing a plane with some surface texture, e.g., four or more points in general position, or the equivalent. This provides full projector pose relative to the surface 140.

The third method uses the inertial sensor 126, which provides an estimate of change in pose between successive time-steps.

After the pose is determined, the projected beam 132 can be stabilized.

Quasi-Stabilized Projection

A quasi-stabilization preserves the form of the projection, i.e., shape and orientation, but permits translation in the plane in accordance with projector motion.

An image acquired by the camera 122 of the four laser points 134 is used to determine the pose of the projector relative to the display surface 140, up to an unknown translation in the plane, and unknown rotation around the plane normal. Smoothing can be achieved by applying a Kalman filter to the laser points detected in the input image 137.

The inertial sensor 125 is used to determine the direction of gravity, which serves to fix the unknown rotation around the normal of the plane normal, for non-horizontal planes.

Given the pose of the projector, up to an unknown translation in the plane, this is all the information needed to generate a projection of the desired size and orientation on the plane.

The inertial sensor 125 that is incorporated into the controller by can estimate changes in controller pose to estimate new coordinates for the laser points 134, and then proceeds as above.

Absolute Stabilized Projection

Absolute stabilization keeps the projection static on the display surface 140, factoring out motion of the projector completely. Absolute stabilization is possible when the camera 122 viewing four or more fixed points on the projection surface, or the equivalent, in general position on a planar display surface.

The goal is to find a homography $H_{PS}$ between the projector image plane and a coordinate frame on the surface. Because the homography $H_{PS}$ specifies the mapping between each pixel on the projector image plane 141 and a known coordinate frame on the display surface 140, it is then straightforward to warp the raw image data to the image plane of the projector to attain the desired projection on the surface 140.

The following describes the steps for determining the homography $H_{CS}$ between the camera image plane 142 and a coordinate frame of the display surface 140, using the surface texture. First, determine the homography $H_{CP}$ induced by the surface between the camera image plane and the projector image plane, using the camera view of the four laser points projected by the tag controller system 102.

Determine the required homography between the projector image plane 141 and the coordinate frame on the display surface 140 as $H_{PS}=H_{CS}H^{-1}{}_{PC}$. Smoothing and the incorporation of inertial sensor measurements are as for the quasi-stabilization described above.

Interactive Projection

The term 'interactive projection' is used to refer to 'mouse-style' interaction with projected image data 132. Functionality to do pointing on a projection could be achieved with a touchpad on the hand-held projector system, or alternatively with a laser pointer separate to the pointers 126. However, those interactive modalities are inconsistent with a compact controller and one-handed interactive operation.

Instead, we describe how to use motion of the hand holding the controller 102 to track a cursor across a stabilized projection. Like a mouse, the controller 102 has two buttons 127 for selecting when a displayed cursor is at a desired point.

Interactive projection employs absolute stabilization as described above, and therefore requires the surface to have some texture. To describe this interactive projection, first note that conceptually we have two types of projection.

The first type of projection is static data on the projector image plane 141 such that, as the projector is moved, the projection on the display surface moves in direct correspondence. The second type of projection, introduced in the previous section on absolute stabilization, is static data on the display surface, obtained by continually updating the data on the projector image plane 141 to factor out the effects of projector motion.

Now note that both types of projection can be done concurrently. We apply absolute stabilization to some required content such as a 'desktop' environment. This results in dynamic update of the content on the projector image plane. But we also always set the cursor icon at the same fixed pixels in the center of the projector image plane 141. Thus, as the projector moves, the user sees a static projection of the 'desktop' environment with the cursor tracking across it. Furthermore the cursor motion follows the motion of the hand-held controller, so it is a natural interaction for the user. With the ability to point, projection becomes interactive. In fact all the standard mouse interactions from a 'WIMP' interface are possible.

One difference with our system is that the cursor can be used to indicate either a selection in the projected content, or a selection on real texture in the physical world. This opens up new types of interaction possibilities. For further details, see U.S. patent application Ser. No. 10/636,356, "Projector as an Input and Output Device," filed by Beardsley et al., on Aug. 7, 2003, incorporated herein by reference.

Interaction with Projected Content

Option Selection

In this application, a user desires to invoke a standard query, such as, "How close is the inventory to its expiration date?" This can be done by having a menu or a button on a stabilized projected image, and selecting with the cursor in the usual way.

Tag Selection.

Tags in the projector beam 132 are highlighted by projected augmentation to indicate their locations to the user. The augmentation can show a selection icon next to each tag. The cursor is tracked to the selection icon and a pushing a button 127 toggles a state of the item.

Alternatively, the cursor can be used to select a rectangular region of interest (ROI) by a click-and-drag operation, with a stable view of the selected rectangle providing as visual feedback about the selection, to select multiple tags simultaneously.

Controlling Placement of Augmentation

The user can use the cursor to 'grab' individual items in the projected augmentation and move them to a preferred layout. This can be done by acquiring an input image of the scene with the camera 122.

Interaction with Physical Texture

The cursor can be used to indicate a point or a region of physical texture in the scene viewed by the camera 122. The texture can be acquired by the camera and further processed. We described 'texture-keys' to attach data items to the environment, and copy-paste of selected texture below.

Warehouse Application

A warehouse manager can use the system 100 to annotate food products, and another employee can subsequently retrieve the annotation. In more detail, the manager first uses the output signal 131 to activate selected tags, and then uses the controller 102 to select and transmit the query 'find-products' that will expire within two days using the output signal 131. Selection is done by projected menu or button as described above.

A tag that is in the projector beam 132, checks its expiration date and sends an input signal 133 of its expiry status back to the controller 102. The controller determines the 3D location of all illuminated tags as described above, and projects green circles on those objects or tags that are not about to expire, and red circles on others, for example.

The manager can then select a subset of red-circled objects, either by individual tag selection or region selection as described above, and the circle illumination changes to blue. The red and green circles on the other tags remain stabilized on the physical surfaces throughout. The manager selects and transmits the request 'mark-selected-objects' for removal, and the selected tags record the request internally. A subsequent user selects and transmits the query 'show-items-requiring-action'. The projector 121 illuminates all annotated items with colored circles, and projected augmentation indicates the actual annotated instructions.

Higher-Level Functions

Single Tags

With single tags, it is possible to detect a particular tag by first illuminating the tag first with light to select the tag. Then, the tag can be read using input signals 133. Data stored in the memory 113 of the tag can be updated. The controller 102 can also store a local context of the tag by storing an image and geometry of environment surrounding the tag, and subsequently track the tag.

Multiple Tags on a Single Rigid Object

This functionality allows projector interaction from multiple directions. The 3D position of tags in an object-centered frame is determined. Dimensional and orientation data are associated with the object based on 3D tag data. Tag neighbor information is stored. A view-independent image texture for the surface of the object is stored. The pose of a projector illuminating the tags in the object coordinate frame is computed. Short-timescale non-rigidity, e.g., crushed inventory can be detected, as well as long-timescale non-rigidity, e.g., growth. Also, geometric history such as tilt can be stored.

Interaction between Tagged Objects

This functionality can record a history of placement among neighboring objects, distinguish between tags on different objects, or interact with tags in a single logical or physical grouping.

Distributed Tags

In this application, tags are distributed in the environment, such as on large walls, floors, ceilings, and objects. In this way, the tags are used as ad-hoc markers to track day-to-day changes, and to determine a structure or topology of the environment. The computed structure can be displayed on surfaces in the environment.

Geometric Configuration

In this application, the 3D coordinates of a set of tags on an object are determined. For example, the object is a newly manufactured object, and the data in the memory 113 needs to be initialized for subsequent augmentation and interaction. The tag's location can be determined by triangulation, however, errors in individual calculations make this approach unsuitable to determine locations of multiple tags in a common reference frame. Therefore, we use the approach based on structure-from-motion as described above.

Storing Local Context

We can acquire a context of image texture for the area around a tag using the controller 102. A distortion free version of the context can be stored with the tag 101, and retrieved for subsequent use from any arbitrary viewpoint. In another example, the stored image texture is used to detect changes in the local context.

The steps to perform this function include collecting image texture in the vicinity of the tag, normalizing the image texture to remove viewpoint dependencies, such as perspective effects. The image texture can be processed as required, and the texture and meta-data can be stored with the tag 101.

The acquired texture can be for an area of fixed size area around the tag, or for a multi-tagged object with a computed Delaunay triangulation, the texture can be for individual mesh facets. During retrieval, the object can be viewed from an arbitrary viewpoint and the texture reprojected to its correct position. If the tag positions have been deformed, then the amount of deformation can be determined explicitly as described herein, or the underlying images can be warped to match the tag vertices.

Geometric Grouping

A set of tags can be partitioned into groups of tags according to fixed or varying characteristics of the objects on which the tags are placed. Some tag sets can be usefully broken into sub-groups, for example, tags on an object that is articulated, e.g., hinged panels, or objects with removable parts. Knowledge of the groups allows augmentation to adapt correctly to the current state of the object, e.g., door open, internal drawer partly withdrawn, etc. A more challenging problem is grouping uninitialized tags on distinct objects. Without physically isolating individual objects, we cluster tags per object by observing coherent rigid motion.

We detect the 3D locations of tags $X_i$ and $X'_i$, at two different instances from two possibly different views. We segment the tag displacements $(X_i-X'_i)$ in the two views using an affinity matrix based approach, see Weiss, "Segmentation using eigenvectors: a unifying view," *CVPR*, pp. 975–982, 1999. An affinity matrix W is a symmetric matrix given by $W(u, v)=e^{-d(u,v)/2\sigma^2}$, where $d(u, v)=(|X_u-X'_u|-|X_v-X'_v|)^2$, and $\sigma=\max(|X_u-X'_u|)$. The large values in the eigenvector corresponding to the largest eigenvalue of W give clustering for a dominant group.

Geometric Deformation

We can also detect a non-rigid deformation in a set of tags. This way, changes in the surface of the object on which the tags are mounted can be detected. This can be useful to detect and highlight changes. Some example applications include detecting for pressure damage during shipping, tracking growth, or monitoring deformations due to moisture or heat.

Each tag stores its 3D position, and acquired pre-deformation, as described herein. The procedure to detect non-rigid change between the undistorted 3D positions $X_i$ and a current view of the tags includes the following steps.

Find the tag positions $x_i$, on the projector image plane, to obtain the correspondences $(x_i, X_i)$.

Using a RANSAC approach, take a subsample of four correspondences from the full set $(x_i, X_i)$, see Fischler et al, "RANSAC: Random Sample Consensus: a paradigm for model fitting with application to image analysis and automated cartography," Commun. Assoc. Comp. Mach., Vol 24, 1981.

Estimate a pose projector pose Γ' from the subsample. Determine the inlying correspondences to this solution, i.e., the solutions having a reprojection error $|x_i-\Gamma'X_i|$ less than threshold d.

Continue for n random subsamples, retaining the pose Γ with the largest number of inliers. After the pose Γ and the inliers have been determined, the new 3D tag positions, $X_i'$, are determined by estimating the rigid transform [R T] of the inliers between the two coordinate systems by decomposing the covariance matrix $B=(X'_i-\overline{X}'_i)(x_i-\overline{X}_i)$. The rotation is $R=VU^T$, and $t=\overline{X}_i-\overline{X}'_i$, where a singular value decomposition is B =UDV, see Horn, *Robot Vision*, MIT Press, 1986.

Texture Keys

Interactive projection supports a straightforward way to attach and retrieve electronic data at relatively arbitrary locations in an environment. Assume a user wishes to use the hand-held system 100 to attach some data to, say, a light switch. On a subsequent occasion, the user directs the hand-held projector at the light switch and is automatically presented with a projection of the stored data. This is achieved in the following way.

The user directs the projector at the light switch, and uses region selection to outline a rectangular ROI for the switch. The camera image data for the ROI, i.e., a 'texture key', is stored along with the data item. On a subsequent visit, the user again selects a ROI around the light switch. The image data for the new ROI is matched against all stored texture keys by template matching, and the data item associated with the best match is projected onto the surface. Interactive projection allows the user to delineate just the required area of texture to be used as a key to the data item. Template matching is a rudimentary matching technique, which works best with 2D texture and is somewhat viewpoint-dependent. In fact matching with a viewpoint-dependent technique is acceptable if it is the intent to retrieve electronic items via viewpoint as well as selected physical texture. In any case, it is straightforward to substitute other matching techniques.

Copy-Paste

Copy-and-paste is another example of an interactive projection for use in environments. We use the camera 122 to acquire scene texture, which is normalized to remove viewpoint dependencies, and paste this texture onto a new surface without distortion.

There are a number of ways to select a physical region of interest for copy, including the method described above for selecting a rectangular ROI. A simple method is described here. A largest vertically aligned inscribed rectangle inside the projected quadrilateral on the planar surface defines the copy area.

The steps for copy-and-paste include: determining the 3D coordinates of the vertices of the projection quadrilateral on the display surface, finding the largest inscribed rectangle, S, inside the projection quadrilateral, and aligned with the world vertical obtained from inertial sensor 125, determine the projection of S to the camera image plane. Store the image texture for S, incorporating a warp to obtain a rectangle of the correct aspect ratio. For pasting at a new location, find an inscribed rectangle on the display surface as above. Project the stored texture centered to this rectangle.

Photometric Compensation

Photometric compensation can be used to match the 'pasted' image as close as possible to the copy texture. There are two relevant factors, namely attenuation due to distance and orientation, and surface reflectance. Projector illumination at a specific surface point is a function of projector-surface distance along a ray and incidence angle of the projected ray. The dimmest projector illumination falls on a surface point with a largest incidence angle. This sets the brightness limit for the projection. Then, we apply a per-pixel attenuation map to the rest of the image to provide an even illumination.

For a projector pose $\Gamma=[r_1\ r_2\ r_3\ t]$, the homography between the projector image plane and A physical surface is $H_P=[r_1\ r_2\ t]$. A projector pixel x maps to 3D point $X=(X, Y, 0)$ where $(X, Y, 1)\cong(H_P)^{-1}x$. The angle between the projector ray and surface normal at X is $$\theta=\cos^{-1}(V\cdot(0,0,1)),$$

where the projector ray is $V=(-R'_t-X)/|(-R'_t-X)|$. If the largest incidence angle is $\theta_m$, then attenuation at every projector pixel x is $\cos(\theta_m)V_z$, where $V_z$ is the $z^{th}$ component of the vector V given above.

We achieve this attenuation with a simple pixel shader procedure. For reflectance compensation, we avoid explicit albedo calculation by noting that the copied texture and the view of the illuminated surface after paste operation are both acquired by the same camera 122. We take an image of the paste surface for two different illuminations by the projector 121. Given camera intensities $I_1$ and $I_2$, for a given camera pixel under the two illuminations $L_1$ and $L_2$, and a target paste intensity of $I_T$, the required linearly interpolated projector illumination is $L=L_1+k(L_2-L_1)$, where $k=(I_T-I_1)/(I_2-I_1)$. For color images, we apply the correction independently in each color channel.

Innovative Display

Additionally, the tag 102 can be equipped with an environmental sensor 115, for example, a thermometer. Such tags can then be distributed in an environment. The tags can be selectively read, the temperate at the various sensors can be displayed back in the environment.

Automated Packing

Tags can store the physical characteristics of the objects to which the tags are attached. In this case, the sensor can be like the inertial sensor 125. This way, an automated packing system can select objects and pack the objects according to their physical characteristics, and orientation.

Product Augmentation

Interactive projection can provide dynamic displays with product augmentation in retail stores. Projectors are more easily deployable than large screens, and allow display on and interleaved with physical products. User-placed tags delineate the projection area, and the projector can customize the projection according to the presence of tagged products e.g., spotlighting of individual shoes on a sports shoe display, with dynamic update as tagged products disappear or change position.

Autonomous Robotics

Autonomous robots are becoming more common in factories, institutions, and homes, e.g., vacuum cleaners. However, autonomous robots face problems in arbitrary environments. Tags as described herein can be used to indicate a 3D context to a robot, both environmental context, such as doorways, and other movable objects. As an important supplemental task, a user can verify the tagged area by querying it with a hand-held system 100 to ensure the setup is correct for the robot, and any required update to placement of the tags is straightforward.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A wireless location and identification system, comprising:
   a controller, comprising:
      a projector configured to generate a unique temporal sequence of light intensities for each pixel in an output image of the projector;
      a wireless transceiver configured to emit an output signal and receive an input signal; and
   a tag, comprising:
      a photo-sensor configured to sense the unique temporal sequence of light intensities of a particular pixel;
      a transducer configured to receive the output signal from the transceiver;
      means for modulating, according to the unique temporal sequence of light intensities, the input signal for the transceiver in response to receiving the output signal and sensing the unique temporal sequence of light intensities of the particular pixel to indicate a location of the tag to the controller.

2. The system of claim 1, in which the tag further comprises:
   a memory storing an identification of the tag; and
   means for modulating, according to the identification, the input signal for the transceiver in response to receiving the output signal.

3. The system of claim 2, in which the memory stores the location.

4. The system of claim 2, in which data stored in the memory is updated over time.

5. The system of claim 1, in which the tag further comprises:
   a microcontroller connected to the transducer and the photo-sensor and a memory.

6. The system of claim 1, in which the tag further comprises an environment sensor connected to the microcontroller.

7. The system of claim 1, in which the tag is mounted in an object, and the controller is hand-held and mobile during operation.

8. The system of claim 1, in which the tag is mounted in an environment, and the controller is hand-held and mobile during operation.

9. The system of claim 1, in which the transducer and photo-sensor are approximate to an external physical surface.

10. The system of claim 1, in which the transducer is an antenna tuned to a predetermined radio frequency.

11. The system of claim 1, in which the tag acquires power parasitically.

12. The system of claim 1, in which the photo-sensor is driven in reverse bias to sense light and forward bias to emit light in response to sensing the unique temporal sequence of light intensities.

13. The system of claim 1, in which the controller further comprises:
    a processor connected to the projector, the transceiver, and a camera.

14. The system of claim 13, in which the projector is in a fixed physical relationship to the camera.

15. The system of claim 13, in which the location is determined from an input image acquired by the camera of the sequence of light intensities.

16. The system of claim 1, in which the controller further comprises a six degrees-of-freedom inertial sensor.

17. The system of claim 1, in which the controller further comprises:
    a plurality of lasers pointers.

18. The system of claim 1, in which the controller further comprises:
    a plurality of control buttons.

19. The system of claim 1, in which the controller further comprises:
    means for determining a pose of the projector.

20. The system of claim 1, in which the photo-sensor is sensitive only to light at a selected frequency.

21. The system of claim 1, in which the sequence of light intensities for each pixel is in a form of a Gray code.

22. The system of claim 1, in which the system includes a plurality of tags, and a location of each tag is determined by the controller.

23. The system of claim 22, in which the plurality of tags are mounted on a surface, and means for determining a shape of the surface based on the locations of the tags.

24. The system of claim 22, in which the plurality of tags are mounted on a surface, and means for determining a deformation of the surface based on the locations of the tags.

25. The system of claim 1, wherein the controller further comprises:
   means for generating an output image in response to receiving the location of the tag.

26. The system of claim 25, in which the controller is hand-held and moving and the output image is stabilized with respect to the tag.

27. The system of claim 25, in which the output image includes a cursor that moves in correspondence to the moving of the controller.

28. The system of claim 27, in which the cursor selects items displayed in the output image.

29. The system of claim 25, in which the tag is mounted on a surface, and the controller further comprises:
   a camera for acquiring an input image including the tag and the surface; and
   means for incorporating a portion of the input image in the output image.

30. The system of claim 1, in which the location is two-dimensional.

31. The system of claim 1, in which the location is three-dimensional.

32. The system of claim 1, in which the controller further comprises:
   means for photo metrically compensating the light intensities.

33. The system of claim 1, in which the light intensities are infrared.

34. The system of claim 1, in which the tag includes a plurality of photo-sensors.

35. The system of claim 1, further comprising:
   a plurality of light sources illuminating the tag, and the tag further comprises:
   means for sensing any of the plurality of light sources.

36. A wireless location and identification method, comprising:
   projecting, from a controller, a wireless output signal and a unique temporal sequence of light intensities for each pixel in an output image;
   sensing in a tag, the wireless output signal;
   sensing, in the tag, in response to sensing the wireless output signal, the unique temporal sequence of light intensities;
   modulating, in the tag, according to the unique temporal sequence of light intensities, an input signal for the controller in response to receiving the output signal and sensing the unique temporal sequence of light intensities of the particular pixel to indicate a location of the tag to the controller.

* * * * *